United States Patent
Burnham et al.

(10) Patent No.: US 11,745,310 B1
(45) Date of Patent: Sep. 5, 2023

(54) SYSTEMS AND METHODS FOR IMPROVING JET CUTTING PERFORMANCE VIA FORCE SENSING

(71) Applicant: Flow International Corporation, Kent, WA (US)

(72) Inventors: Charles D. Burnham, Southbury, CT (US); Mohamed A. Hashish, Bellevue, WA (US)

(73) Assignee: Flow International Corporation, Kent, WA (US)

( * ) Notice: Subject to any disclaimer, the term of this patent is extended or adjusted under 35 U.S.C. 154(b) by 0 days.

(21) Appl. No.: 17/816,977

(22) Filed: Aug. 2, 2022

Related U.S. Application Data

(62) Division of application No. 16/295,976, filed on Mar. 7, 2019, now Pat. No. 11,433,504, which is a division
(Continued)

(51) Int. Cl.
 *B24C 1/04* (2006.01)
 *B24C 7/00* (2006.01)
 *B24C 3/32* (2006.01)

(52) U.S. Cl.
 CPC .......... *B24C 7/0015* (2013.01); *B24C 1/045* (2013.01); *B24C 3/32* (2013.01); *B24C 7/0023* (2013.01); *B24C 7/0061* (2013.01)

(58) Field of Classification Search
 CPC .. B24C 1/04; B24C 1/045; B24C 3/32; B24C 5/02; B24C 7/0015; B24C 7/0023;
(Continued)

(56) References Cited

U.S. PATENT DOCUMENTS 4,594,924 A 6/1986 Windisch
5,069,234 A * 12/1991 Nielsen .................. B08B 9/023
 451/92
(Continued)

FOREIGN PATENT DOCUMENTS

CN 101670561 B 11/2011
CN 102398226 A 4/2012
(Continued)

OTHER PUBLICATIONS

Burnham et al. (Aug. 1989). Statistical characterization of surface finish produced by a high pressure abrasive waterjet. In Proceedings, 5th American Waterjet Conference (pp. 165-175).
(Continued)

*Primary Examiner* — Eileen P Morgan
(74) *Attorney, Agent, or Firm* — Cozen O'Connor

(57) ABSTRACT

Disclosed herein are systems and methods for improving the performance of a fluid jet cutting system by testing and adjusting characteristics of the system based on the effect of the characteristics on forces imparted by the system to a workpiece being cut. Also disclosed are systems and methods for monitoring and validating the performance of fluid jet cutting systems, and for diagnosing such systems. In some cases, the technologies described herein can be used to determine whether components of a fluid jet system require maintenance, or that characteristics of the system require adjustment.

12 Claims, 5 Drawing Sheets

Related U.S. Application Data of application No. 15/277,891, filed on Sep. 27, 2016, now Pat. No. 10,252,400.

(60) Provisional application No. 62/234,499, filed on Sep. 29, 2015.

(58) Field of Classification Search
CPC ... B24C 7/0053; B24C 7/0061; G05B 19/404; G05B 19/416; G05B 2219/45036
USPC ............................ 451/2, 3, 10, 11, 38, 40, 75
See application file for complete search history.

(56) References Cited

U.S. PATENT DOCUMENTS

| | | | | |
|---|---|---|---|---|
| 5,472,367 | A  * | 12/1995 | Slocum | B23K 26/10 |
| | | | | 451/75 |
| 5,643,058 | A | 7/1997 | Erichsen et al. | |
| 6,155,245 | A | 12/2000 | Zanzuri | |
| 6,244,927 | B1 | 6/2001 | Zeng | |
| 6,655,026 | B1 * | 12/2003 | Iida | C23C 8/80 |
| | | | | 72/340 |
| 6,766,216 | B2 | 7/2004 | Erichsen et al. | |
| 7,455,568 | B2 | 11/2008 | Sekiya | |
| 7,585,201 | B2 * | 9/2009 | Kanai | B26F 3/004 |
| | | | | 451/57 |
| 7,938,713 | B2 | 5/2011 | Trieb et al. | |
| 8,176,819 | B2 | 5/2012 | Rydh | |
| 10,591,891 | B2 * | 3/2020 | Rydh | B26F 3/004 |
| 2012/0022839 | A1 * | 1/2012 | Valicek | G06F 30/00 |
| | | | | 703/2 |
| 2013/0203320 | A1 | 8/2013 | Ghalambor | |
| 2014/0030963 | A1 * | 1/2014 | Kanazawa | B24C 7/0076 |
| | | | | 451/87 |
| 2015/0266161 | A1 * | 9/2015 | Noda | B24C 1/045 |
| | | | | 700/160 |

FOREIGN PATENT DOCUMENTS

| | | | | |
|---|---|---|---|---|
| FR | 2699852 A1 * | 7/1994 | | B24C 1/045 |
| FR | 2699852 A1 | 7/1994 | | |
| JP | 5220700 A | 8/1993 | | |
| WO | 2019009440 A1 | 1/2019 | | |
| WO | WO-2019009440 A1 * | 1/2019 | | |

OTHER PUBLICATIONS

Hunt et al. (1987). Surface finish characterization in machining advanced ceramics by abrasive waterjet. In Proceedings of the Fourth U. S. WaterJet Conference (pp. 262-271).

Lebar et al. (Aug. 2003). Monitoring of the AWJ cutting in the submerged conditions. In 2003 WJTA American Waterjet Conference (9 pages total).

Li et al. (1989). Investigation of forces exerted by an abrasive water jet on a workpiece. In 5th American Water Jet Conference (pp. 69-77).

* cited by examiner

SYSTEMS AND METHODS FOR IMPROVING JET CUTTING PERFORMANCE VIA FORCE SENSING

CROSS REFERENCE TO RELATED APPLICATION

This application is a divisional of U.S. application Ser. No. 16/295,976, filed Mar. 7, 2019, which is a divisional of U.S. application Ser. No. 15/277,891, filed Sep. 27, 2016 (now U.S. Pat. No. 10,252,400), which claims the benefit of U.S. Provisional Application No. 62/234,499, filed Sep. 29, 2015, the contents of which are incorporated herein by reference in their entireties.

BACKGROUND

Technical Field

This disclosure relates to systems and methods for improving the performance of fluid jet cutting systems, and more particularly to systems and methods for improving the performance of fluid jet cutting systems by testing and adjusting characteristics of the fluid jet cutting system based on forces imparted by the system to a sample having characteristics (e.g., material type, material thickness) the same as or similar to a workpiece to be cut.

Description of the Related Art

High-pressure fluid jets, including high-pressure abrasive fluid jets, are used to cut a wide variety of materials in many different industries. Abrasive fluid jets have proven to be especially useful in cutting difficult, thick, or aggregate materials, such as thick metal, glass, or ceramic materials. Systems for generating high-pressure abrasive fluid jets are currently available, such as, for example, the Mach 4 5-axis abrasive fluid jet system manufactured by Flow International Corporation, the assignee of the present invention, as well as other systems that include an abrasive fluid jet cutting head assembly mounted to an articulated robotic arm. Software for controlling such systems is currently available, such as, for example, the FlowMaster™ fluid jet system also available from Flow. Other examples of abrasive fluid jet cutting systems are shown and described in Flow's U.S. Pat. No. 5,643,058, which is incorporated herein by reference.

The terms "high-pressure fluid jet" and "jet" should be understood to incorporate all types of high-pressure fluid jets, including but not limited to, high-pressure waterjets and high-pressure abrasive waterjets. In such systems, high-pressure fluid, typically water, flows through an orifice in a cutting head to form a high-pressure jet, into which abrasive particles are combined as the jet flows through a mixing tube. The high-pressure abrasive fluid jet is discharged from the mixing tube and directed toward a workpiece to cut the workpiece along a designated path. In some cases, the designated path and characteristics of the fluid jet are controlled by software running on a computer system, as further described below.

Various systems are currently available to move a high-pressure fluid jet along a designated path. Such systems may commonly be referred to, for example, as three-axis and five-axis machines. Conventional three-axis machines mount the cutting head assembly in such a way that it can move along an x-y plane and perpendicular along a z-axis, namely toward and away from the workpiece. In this manner, the high-pressure fluid jet generated by the cutting head assembly is moved along the designated path in an x-y plane, and is raised and lowered relative to the workpiece, as may be desired. Conventional five-axis machines work in a similar manner but provide for movement about two additional non-parallel rotary axes. Other systems may include a cutting head assembly mounted to an articulated robotic arm, such as, for example, a 6-axis robotic arm which articulates about six separate rotary axes.

Computer-aided manufacturing (CAM) processes may be used to efficiently drive or control such conventional machines along a designated path, such as by enabling two-dimensional or three-dimensional models of workpieces generated using computer-aided design (i.e., CAD models) to be used to generate code to drive the machines. For example, a CAD model may be used to generate instructions to drive the appropriate controls and motors of the machine to manipulate the machine about its translational and/or rotary axes to cut or process a workpiece as reflected in the model.

The performance of a fluid jet cutting system depends on many characteristics of the system, including the size of a jet orifice of the cutting system, the pressure developed within the cutting system behind the orifice, the type, mesh size, and flow rate of abrasive(s) that may be introduced into the jet, the size of a mixing tube or discharge nozzle of the cutting system, the speed at which the jet is translated across the workpiece, etc. In some cases, the performance of a fluid jet cutting system can be characterized in terms of the quality of the cut formed in the workpiece by a fluid jet of the cutting system, defined in some cases in terms of the roughness, planarity, or consistency of the surface of the workpiece exposed by the cut.

Assessing the quality of a cut formed in a workpiece can be a difficult, time-consuming, expensive, and inexact task. Typically, such an assessment requires that a skilled technician inspect the exposed surface of the workpiece at the cut to provide a qualitative assessment or estimate of the quality of the cut. Devices such as profilometers can be used but do not provide the reliability or accuracy offered by embodiments of the technologies described herein. Thus, in order to test or adjust a characteristic of a cutting system affecting jet performance, such as one of those listed above, a technician must typically make several cuts in a workpiece while varying a characteristic of interest, and inspect the exposed surfaces of each of the several cuts to determine which may be associated with the best performance. This process is prone to errors and can be extremely laborious and time-consuming, and can result in extended periods of machine downtime.

BRIEF SUMMARY

Embodiments described herein can be used to improve the performance of a fluid jet cutting system by evaluating or modifying characteristics of the system based on forces imparted by a jet generated by the system to a sample having characteristics (e.g., material type, material thickness) the same as or representative of a workpiece to be cut.

In some cases, a method of improving fluid jet performance comprises selecting a first setting for a characteristic of a fluid jet system, forming a first cut in a coupon of material using the fluid jet system having the first setting for the characteristic, while forming the first cut in the coupon, measuring a first history of reactive forces imparted by the fluid jet system to the coupon during at least a portion of the first cut, selecting a second setting for the characteristic of the fluid jet system, forming a second cut in the coupon using the fluid jet system having the second setting for the characteristic, while forming the second cut in the coupon, measuring a second history of reactive forces imparted by the fluid jet system to the coupon during at least a portion of the first cut, designating the first setting as a preferred or optimal setting if an average or typical value of the first history of reactive forces is lower than an average or typical value of the second history of reactive forces and a quality of the first cut is acceptable, and designating the second setting as an optimal setting if the average or typical value of the second history of reactive forces is lower than the average or typical value of the first history of reactive forces and a quality of the second cut is acceptable.

In some cases, a method of assessing performance of a fluid jet system comprises situating a workpiece at least partially within a working envelope of a cutting head of a fluid jet cutting system to be cut by the cutting head, situating a coupon at least partially within the working envelope of the cutting head of the fluid jet cutting system to be cut by the cutting head, forming one or more cuts in the workpiece using the cutting head of the fluid jet cutting system, periodically interrupting the forming of the one or more cuts in the workpiece, during at least one of the periodic interruptions, forming a sample cut in the coupon using the cutting head of the fluid jet cutting system, while forming the sample cut in the coupon, measuring a history of reactive forces imparted by the fluid jet cutting system to the coupon, and using the measured reactive forces to assess the performance of the fluid jet cutting system.

In some cases, a method of establishing a working speed comprises forming a plurality of cuts in a coupon using a fluid jet system, each of the plurality of cuts being formed while moving a cutting head of the fluid jet system at a different speed, while forming the plurality of cuts in the coupon, measuring a corresponding history of reactive forces imparted by the fluid jet system to the coupon for each of the plurality of cuts, computing an average or typical reactive force for each corresponding history of reactive forces, designating a first speed corresponding to an average or typical reactive force approximating a threshold allowable force as a preferred or optimal speed, designating a second speed corresponding to the preferred or optimal speed reduced by an offset percentage as an initial working speed, and forming one or more cuts in a workpiece remote from the coupon using the cutting head of the fluid jet system while moving the cutting head at the initial working speed.

In some cases, a method of assessing performance of a fluid jet system comprises, prior to forming one or more cuts in a workpiece with a cutting head of a fluid jet cutting system, forming a baseline cut in a coupon using the fluid jet system while moving the cutting head at an initial working speed, while forming the baseline cut, measuring a corresponding baseline history of reactive forces imparted by the fluid jet system to the coupon, periodically interrupting the forming of the one or more cuts in the workpiece, during at least one of the periodic interruptions, forming a validation cut in the coupon using the fluid jet system while moving the cutting head at the initial working speed, while forming the validation cut, measuring a corresponding validation history of reactive forces imparted by the fluid jet system to the coupon, and comparing the validation history of reactive forces to the baseline history of reactive forces to assess the performance of the fluid jet system.

In some cases, a fluid jet cutting system comprises a fluid jet cutting head, a motion system for manipulating the fluid jet cutting head in space within a working envelope, a coupon platform positioned at least partially within the working envelope, and a force measuring device operatively coupled to the coupon platform to measure forces applied to the coupon platform by a fluid jet discharged from the fluid jet cutting head via the intermediary of a coupon of material positioned on the coupon platform.

BRIEF DESCRIPTION OF THE SEVERAL VIEWS OF THE DRAWINGS

FIG. 1A illustrates an enlarged detail view of the validation system shown in FIG. 1.

DETAILED DESCRIPTION

In the following description, certain specific details are set forth in order to provide a thorough understanding of various disclosed embodiments. However, one skilled in the relevant art will recognize that embodiments may be practiced without one or more of these specific details. In other instances, well-known structures and control techniques associated with fluid jet cutting machines or other multi-axis machines may not be shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

Embodiments of the methods and systems described herein can be used to improve fluid jet cutting system performance, such as by facilitating the testing, evaluation, adjustment, improvement, calibration, or optimization of characteristics of the system. Although some aspects discussed herein may be discussed in terms of waterjets and abrasive waterjets, one skilled in the relevant art will recognize that aspects and techniques of the present invention can be applied to any type of fluid jet, generated by high pressure or low pressure, whether or not additives or abrasives are used.

Figure 1:
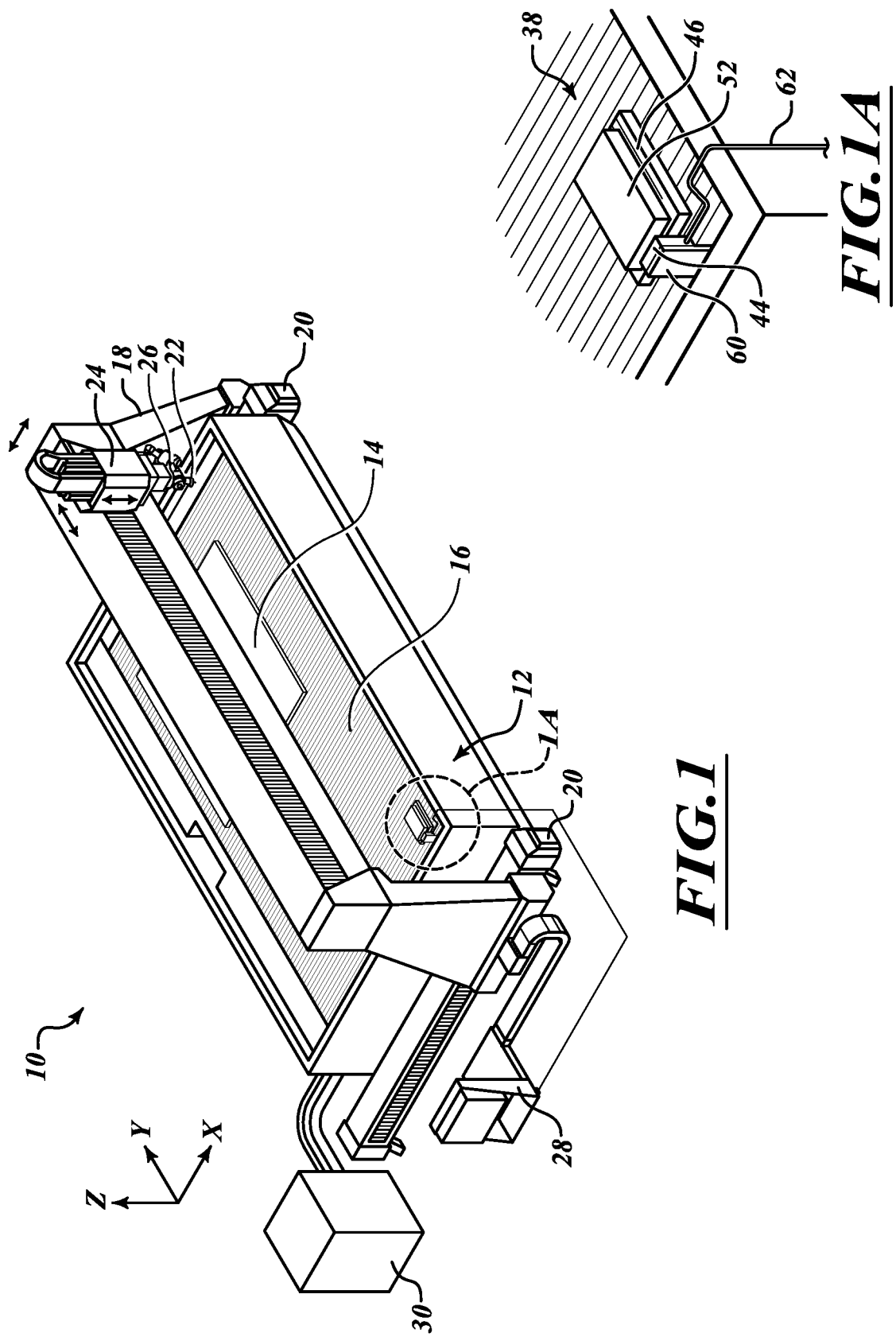
FIG. 1 illustrates a top isometric view of a fluid jet cutting system including a validation system.
Figure 2:
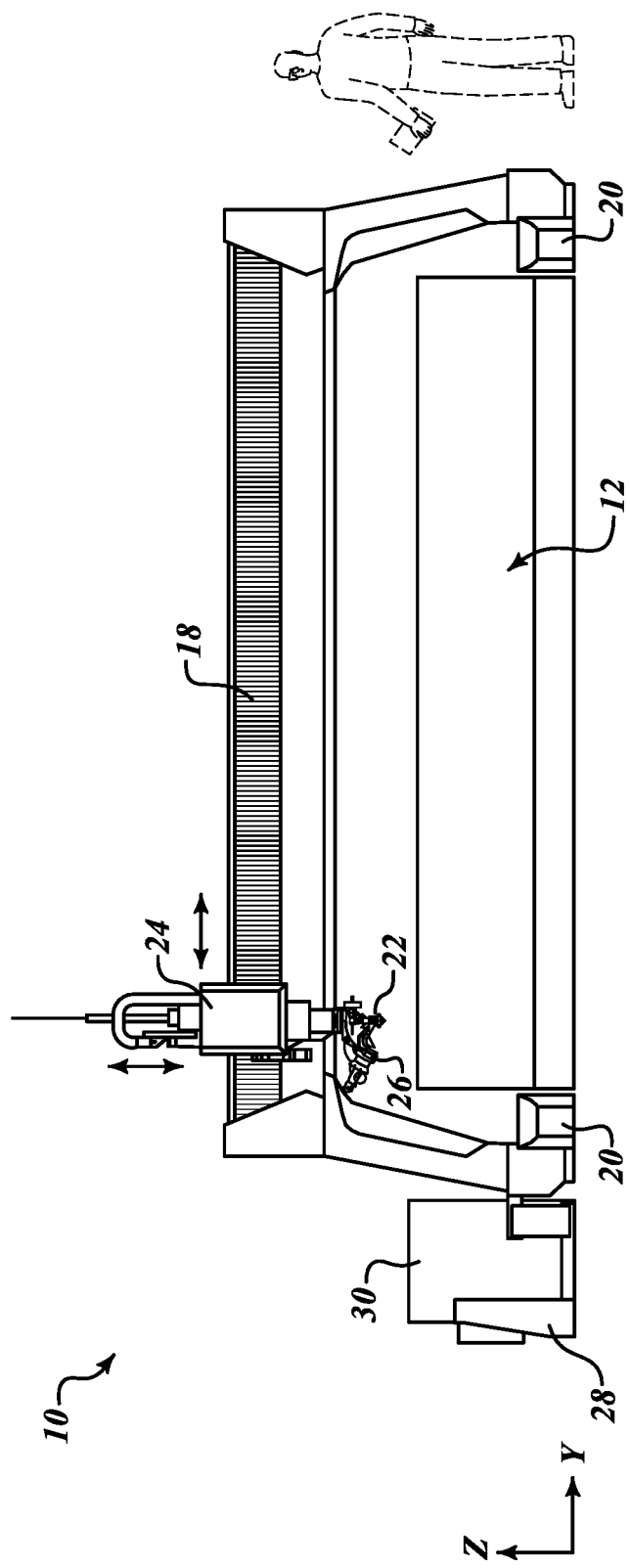
FIG. 2 illustrates a side view of the fluid jet system of FIG. 1.

FIGS. 1, 1A, and 2 show an example embodiment of a fluid jet cutting system 10. The fluid jet cutting system 10 includes a catcher tank assembly 12 which is configured to support a workpiece 14 to be processed by the system 10, such as on supporting elements such as slats 16. "Workpiece," as used herein, can refer to a single one or a plurality of such elements. The fluid jet cutting system 10 further includes a bridge assembly 18 which is movable along a pair of base rails 20 and straddles the catcher tank assembly 12. In operation, the bridge assembly 18 moves back and forth along the base rails 20 with respect to a translational axis X to position a cutting head 22 of the system 10 for processing the workpiece 14. A tool carriage 24 is movably coupled to the bridge assembly 18 to translate back and forth along another translational axis Y, which is aligned perpendicularly to the translational axis X. The tool carriage 24 is further configured to raise and lower the cutting head 22 along yet another translational axis Z to move the cutting head 22 toward and away from the workpiece 14. An articulated forearm and wrist assembly 26 is provided to adjust an orientation of the cutting head 22 relative to the workpiece 14 to enable processing of the workpiece 14 along particularly complex tool paths and tool orientations. During operation, movement of the cutting head 22 with respect to each of the translational axes X, Y, Z and axes of the articulated forearm and wrist assembly 26 may be accomplished by various conventional drive components and an appropriate control system 28, which can include a controlling computer system, as further described below.

A waste removal system 30 may be coupled to the catcher tank assembly 12 to receive and process waste collected from the interior of the catcher tank assembly 12 during operation. Other well-known systems associated with fluid jet cutting machines may also be provided such as, for example, a high-pressure or ultrahigh-pressure fluid source 27 (FIG. 3), which may be a direct drive or intensifier pump with a pressure rating ranging from about 20,000 psi to 100,000 psi and higher, for supplying high-pressure or ultrahigh-pressure fluid to the cutting head 22, and/or an abrasive source 29 (FIG. 3), such as an abrasive hopper and distribution system, for feeding abrasives to the cutting head 22 to enable abrasive fluid jet cutting. In some embodiments, a vacuum device 31 (FIG. 3) may also be provided to assist in drawing abrasives into the fluid from the fluid source to produce a consistent abrasive fluid jet to enable particularly accurate and efficient workpiece processing. Details of the control system 28, conventional drive components and other well-known systems associated with fluid jet cutting systems, however, are not shown or described in detail to avoid unnecessarily obscuring descriptions of the embodiments.

Figure 3:
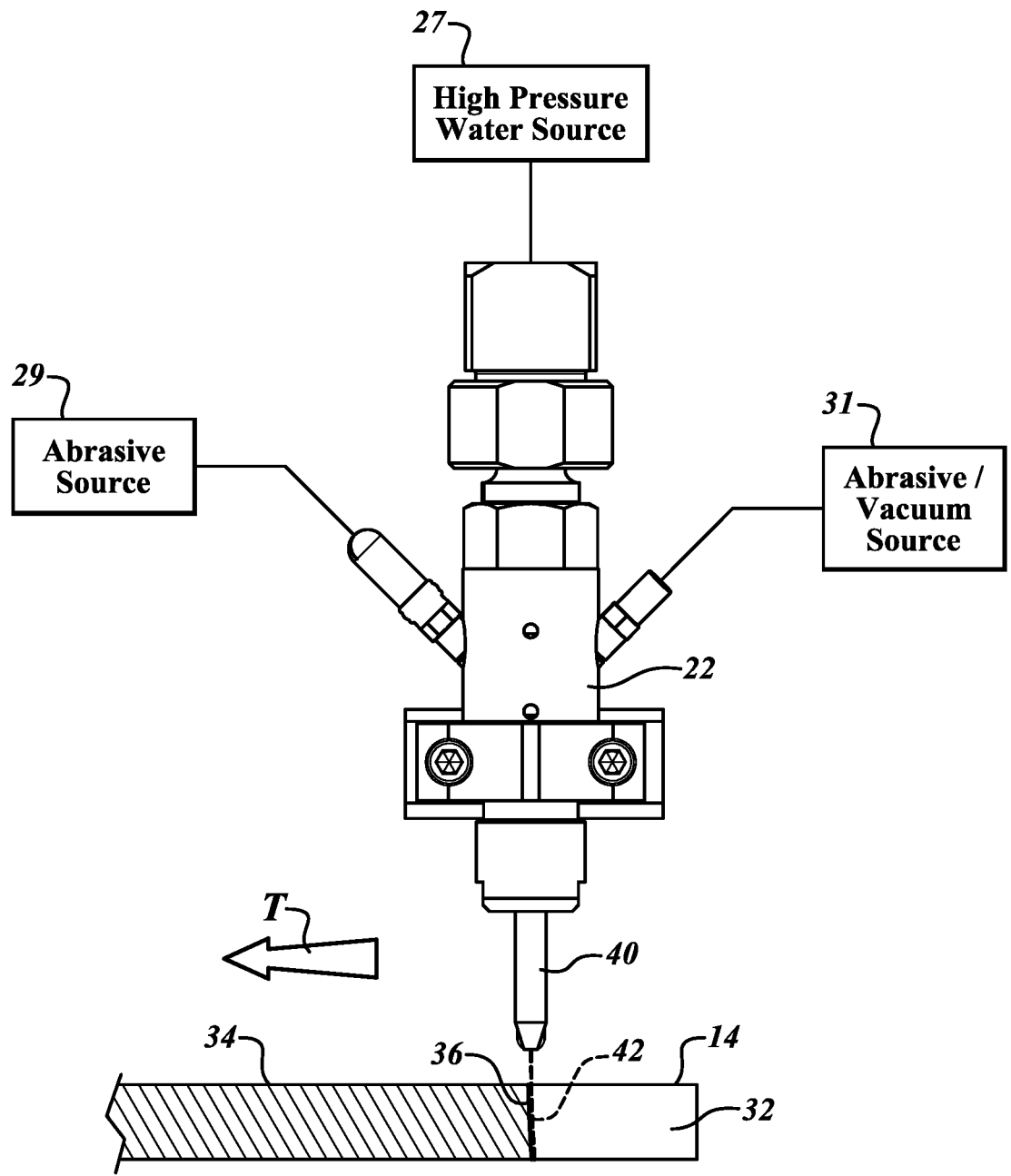
FIG. 3 illustrates a side view of a cutting head of the fluid jet system of FIGS. 1 and 2.

FIG. 3 shows the cutting head 22 in operation. The cutting head 22 includes a mixing tube or nozzle 40, from which a jet 42 exits at high speed. In some cases, the jet 42 is an abrasive fluid jet including a fluid such as water mixed with abrasive particles. FIG. 3 shows that the cutting head 22 can be situated above the workpiece 14, such that the nozzle 40 and jet 42 extend downward toward the workpiece 14, and such that the jet 42 approaches the workpiece 14 along an axis generally perpendicular or slightly inclined relative to an upper surface of the workpiece 14. As the cutting head 22 is operated to direct the jet 42 toward the workpiece 14 to cut the workpiece 14, the cutting head can be moved laterally over the workpiece 14 in a travel direction T (e.g., along one or both of the translational axes X, Y) so as to cut the workpiece 14 along a designated path. FIG. 3 shows a surface 32 of the workpiece 14 exposed by the cutting action of the jet 42, and an un-cut portion 34 of the workpiece 14.

Cutting of the workpiece 14 is accomplished by the impact of, and the corresponding force imparted by, the jet 42 against the workpiece 14. In some cases, as the cutting head 22 moves laterally to cut the workpiece 14, a cutting surface 36 at the leading edge of the cut becomes curved, such that the exposed surface 32 extends farther in the travel direction at the top of the cut than at the bottom of the cut. The degree of this curvature can be influenced by the thickness of the workpiece. For example, the cutting surface of a relatively thick workpiece typically has a greater curvature than the cutting surface of a relatively thin workpiece. This curvature occurs as a result of a phenomenon known as "tailback" or "drag," as shown and described in more detail in U.S. Pat. No. 6,766,216 (see, e.g., background section and FIG. 2 thereof), which is hereby incorporated herein by reference in its entirety. As a result of this curvature, the force imparted by the jet 42 to the workpiece 14 is not necessarily entirely vertical. In some cases, the force $F_j$ imparted by the jet 42 to the workpiece 14 has a vertical component $F_v$ and a horizontal component $F_h$.

While not being bound by any particular mode of action, it is believed that a curvature of the cutting surface 36 and other aspects of the resulting edges and faces of the workpiece adjacent the cut are a function of a variety of characteristics of the system 10. Further, it is believed that a greater curvature of the cutting surface 36 is correlated with rougher exposed surfaces at the cut, e.g., surface 32. Thus, in some cases, the degree of the curvature of the cutting surface 36, or the amount by which the exposed surface 32 extends farther in the travel direction at the top of the cut than at the bottom of the cut, can be used in the various embodiments described herein as indicative of cut quality.

Further still, a greater curvature of the cutting surface 36 is correlated with higher forces $F_v$ and $F_h$ (and thus $F_j$) imparted by the jet 42 to the workpiece 14. Thus, in various embodiments described herein, the effect of a characteristic of the system 10 on the forces $F_v$, $F_h$, and/or $F_j$ imparted by the jet 42 to the workpiece 14 are studied to assess the effect of that characteristic on the performance of the system 10 and the quality of cuts formed in the workpiece 14 by the jet 42 of the system 10. In some cases, preliminary studies can be conducted to assess and/or quantify a relationship between one or more of the forces $F_v$, $F_h$, $F_j$, and cut quality for a variety of materials, such that for any specified material and cut quality, a corresponding force $F_v$, $F_h$, and/or $F_j$ may be generally known. These corresponding forces can then be used in the various embodiments described herein as indicative of cut quality, for example.

Figure 4:
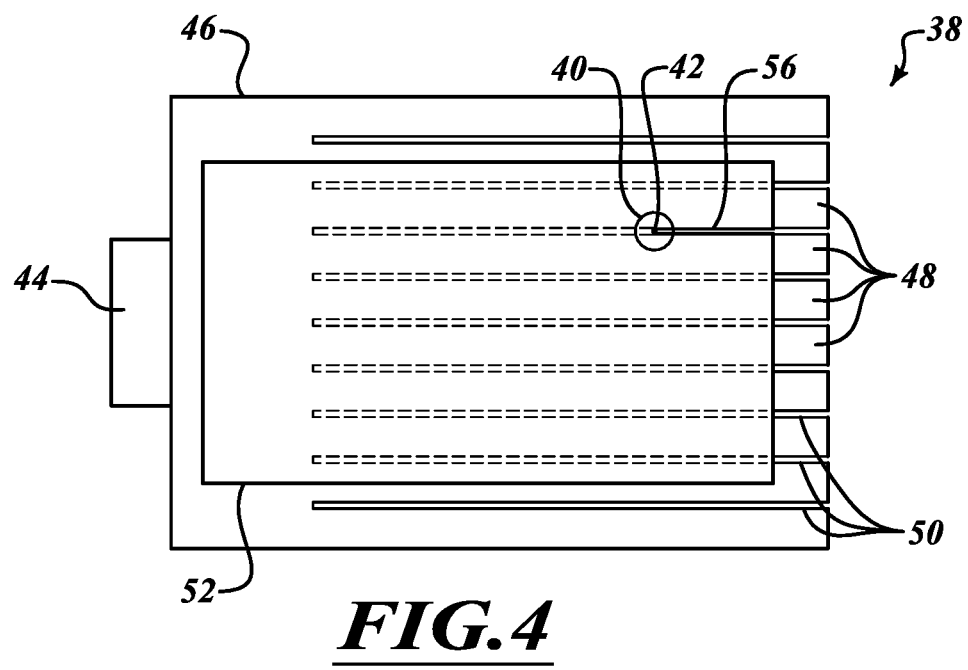
FIG. 4 illustrates a top plan view of a portion of the validation system shown in FIGS. 1 and 1A.
Figure 5:
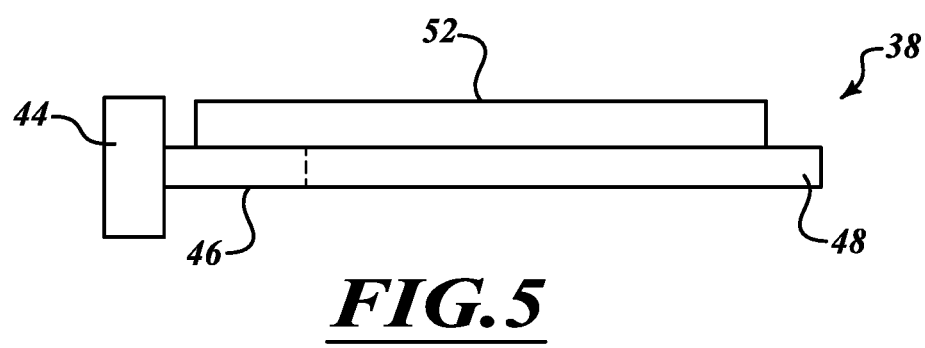
FIG. 5 illustrates a side view of the portion of the validation system shown in FIG. 4.

With reference to FIGS. 1A, 4 and 5, and in accordance with some embodiments, the system 10 can include a validation system 38, which can be used to test, evaluate, adjust, improve, or optimize one or more characteristics of the system 10. As shown in top and side views in FIGS. 4 and 5, respectively, the validation system 38 can include a force measurement device 44, which in some cases may be a force dynamometer including a horizontal force transducer and a vertical force transducer. The validation system 38 can also include a base plate 46 having a plurality of fingers or other support structures 48 separated by a plurality of clearance slots 50. The base plate 46 can be rigidly coupled to the force measurement device 44 so that forces (vertical and/or horizontal) imparted to the base plate 46 can be measured by the force measurement device 44.

The validation system 38 may be configured to receive and support a sample or coupon 52, which can comprise a relatively small piece of material having material and other characteristics (e.g., thickness) substantially matching that of, or representative of, a workpiece 14 to be cut by the system 10. "Sample" or "coupon," as used herein, can refer to a single one or a plurality of such elements. In some instances, the sample or coupon 52 may consist of an actual piece of material removed from the workpiece 14 to be processed. Forces imparted to the sample or coupon 52 by the jet 42 discharged from nozzle or mixing tube 40 can be treated as generally representative of forces expected to be imparted to the workpiece 14 by the jet 42 during actual cutting of the workpiece 14 remote from the sample or coupon 52. The sample or coupon 52 can be rigidly coupled or fixed to the base plate 46 such that forces imparted to the sample or coupon 52 are transferred to the base plate 46, such as, for example, via a clamp or other attachment device (not shown).

The validation system 38 can be situated within and/or coupled to the catcher tank assembly 12 (FIGS. 1, 1A, and 2) so that the system 10 can be used to cut the sample or coupon 52, in a manner similar to that described above for the workpiece 14. For example, the validation system 38 can be mounted to a side of the catcher tank assembly 12, or on a stand 60 within the catcher tank assembly 12. In other instances, the validation system 38 can be mounted near or adjacent to the catcher tank assembly 12 or a different workpiece support system, but nevertheless at least partially within a working envelope of the fluid jet cutting system 10 such that the cutting head 22 can make cuts on the sample or coupon 52 prior to, during or after making one or more cuts on the workpiece 14.

The validation system 38 can be coupled to the control system 28 by a communications link 62, and to the controlling computer system, which can receive one or more signals from the force measurement device 44, such as a signal corresponding to a measured horizontal force, a signal corresponding to a measured vertical force, and/or a combination thereof.

Some embodiments described herein include the measurement of various forces, such as forces $F_j$, $F_h$, or $F_v$ imparted by the jet 42 to the sample or coupon 52. Many different techniques can be used to measure one or more such forces. For example, the measurement device 44 can measure these forces either continuously, generating, e.g., an analog response signal, or discontinuously, at any one of a wide range of frequencies, generating, e.g., a digital response signal. The data generated by the measurement device 44 can be recorded and/or analyzed by the computer system to provide an average or typical or representative force measurement.

In some cases, an average force measurement can be calculated as the mean, the median, or the mode of the data generated by the measurement device 44. In some cases, an average force measurement can be calculated as a weighted average of the data generated by the measurement device 44, for example, by weighting measurements taken during a middle portion of a cut more heavily than measurements taken during other portions of the cut. In some cases, an average force measurement can be calculated based on a history of reactive forces imparted by the jet 42 to the sample or coupon 52 during an entire cut, while in other cases, the average can be calculated based on a history of reactive forces imparted by the jet 42 to the sample or coupon 52 during only a portion of the cut.

In some cases, a typical force measurement can be determined by a technician based on a review of the data generated by the measurement device 44, for example, as an estimate of an average of the data. In some cases, a representative force measurement can be an average force measurement, a typical force measurement, or any other force measurement representative or characteristic of the data generated by the measurement device 44. In some cases, a force measurement at a predetermined time can be considered a representative force measurement, e.g., a force measurement taken at the half-way point of a cut can be considered representative of the forces imparted by the jet 42 to the sample or coupon 52.

In some embodiments, the system 10 can be used to form a plurality of cuts in the sample or coupon 52, such as at locations corresponding to the clearance slots 50 such that only the interaction of the jet 42 with the sample or coupon 52 causes resultant forces measured by the force measurement device 44. In some cases, in order to assess the effect of a characteristic on the performance of the system 10, the characteristic can be varied while forming the plurality of cuts in the sample or coupon 52. As one example, to assess the effect of the speed of the translation of the cutting head 22 across the sample or coupon 52, the system 10 can be used to form a first cut in the sample or coupon 52 while the cutting head 22 is translated at a first rate, such as, for example, 0.2 mm/s, a second cut in the sample or coupon 52 while the cutting head 22 is translated at a second rate, such as, for example, 0.4 mm/s, and a third cut in the sample or coupon 52 while the cutting head 22 is translated at a third rate, such as, for example, 0.8 mm/s. All other characteristics of the cutting system 10 can be held constant during this process in order to isolate the effect of the translation speed on system cutting performance.

The plurality of cuts can be formed in the sample or coupon 52 while the sample or coupon 52 is supported by the validation system 38 described above. Thus, the forces imparted to the sample or coupon 52 during the formation of each of the cuts can be measured, and represented by data processed and/or stored in the computer system, as described elsewhere herein. In some cases, the data representing the forces can be stored as it is recorded, while in other cases, some pre-processing can be conducted on the data before it is stored. For example, the data representing the forces can be divided by another, baseline force, such as a maximum force, such that the stored data represents the forces normalized by the baseline force. Based on the resulting measured forces, a preferred, optimal, or improved translation speed can be ascertained or established. For example, the data can be analyzed to determine a force or force range at which cut quality transitions between acceptable and non-acceptable quality standards, and the translation speed associated with the force or force range can be established as an optimal or improved translation speed. In some instances, a rate of change of the detected force may be used to determine the optimal or improved translation speed. This process can be used to ascertain or establish optimal or improved values, choices, properties, or settings for a variety of characteristics of the system 10, including any of those described herein.

In some cases, forces imparted by the jet 42 to the workpiece 14 or the coupon 52 can be different in cases in which the jet 42 is used to initiate a cut into the workpiece 14 or the coupon 52 than in cases in which the jet 42 is used to continue an initiated cut through the workpiece 14 or coupon 52. Further, forces imparted by the jet 42 to the workpiece 14 or the coupon 52 can be different in cases in which the jet 42 is used to initiate a cut into a side of the workpiece 14 or the coupon 52 than in cases in which the jet 42 is used to initiate a cut into a center region of the workpiece 14 or the coupon 52 (that is, pierce the workpiece 14 or coupon 52). Unless specified otherwise, measurements of forces such as $F_j$, $F_h$, or $F_v$ are conducted when the jet 42 is "fully engaged," that is, used to continue a cut by entering a top surface of the workpiece 14 or coupon 52, exiting a bottom surface of the workpiece 14 or coupon 52, and cutting (e.g., removing material from) the workpiece 14 or coupon 52.

In alternative embodiments, however, measurements can be conducted as the jet 42 is "partially engaged," that is, used to initiate a cut into the workpiece 14 or coupon 52, such as to ascertain or establish optimal or improved values, choices, properties, or settings for various characteristics of the system 10 for use in initiating a cut into the workpiece 14 or coupon 52. In cases in which the jet 42 is partially engaged, measured forces can vary non-linearly as the jet 42 moves with respect to the workpiece 14 or coupon 52.

Figure 6:
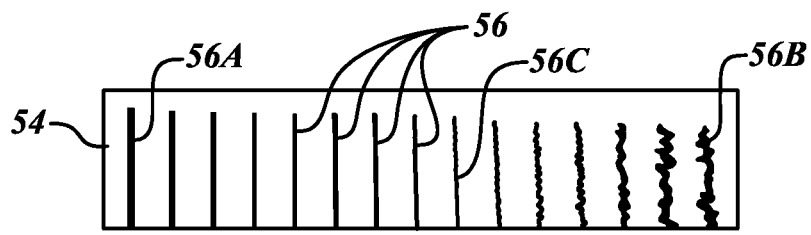
FIG. 6 illustrates a plurality of cuts formed in a coupon of material using a fluid jet cutting system while moving a cutting head of the fluid jet system at different speeds.
Figure 7:
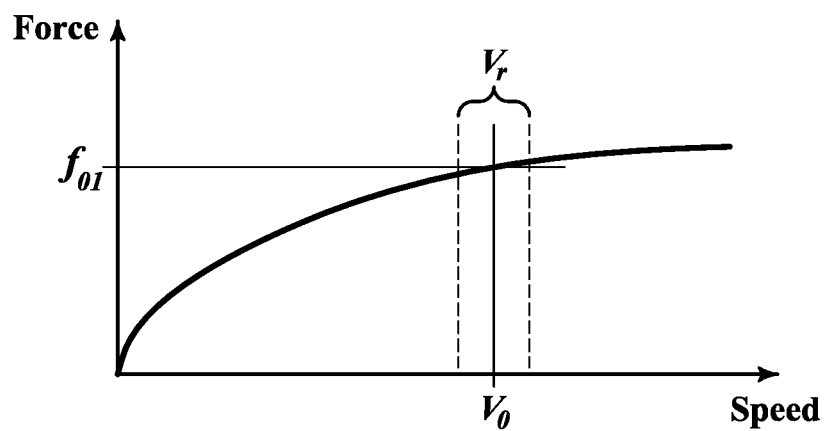
FIG. 7 illustrates a relationship between cutting head translation speed and resulting reactive forces imparted by a fluid jet on a sample or coupon of material.
Figure 8:
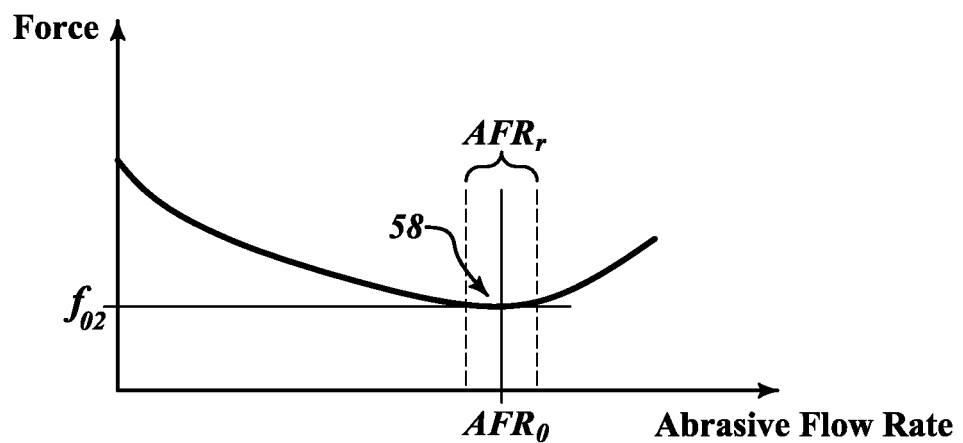
FIG. 8 illustrates a relationship between abrasive flow rate of an abrasive fluid jet system and resulting reactive forces imparted by an abrasive fluid jet on a sample or coupon of material.

FIGS. 6 through 8 show examples of results of such assessments. In particular, FIG. 6 shows a bottom portion of a coupon 54 and a plurality of cuts 56 formed by a fluid jet cutting system in the coupon 54. Cut 56A formed in a left portion of the coupon 54, as shown in FIG. 6, was formed while moving the cutting head 22 at a relatively slow speed, while cut 56B formed in a right portion of the coupon 54, as shown in FIG. 6, was formed while moving the cutting head 22 at a relatively fast speed. Each of the cuts 56 between cut 56A and cut 56B was formed while moving the cutting head at a different speed, which increased successively for each of the cuts 56 from cut 56A to cut 56B. In some instances, the speeds may be increased in regular intervals, and in other instances, may be increased in irregular intervals. In addition, it is appreciated that the cuts can be made at successively decreasing speeds or at otherwise varying speeds provided that a significant sampling of cuts at different speeds is made.

As shown in FIG. 6, the quality of the cuts 56 generally degrades as the translation speed increases. This relationship is further illustrated by the data shown in FIG. 7, which plots translation speed of the cutting head 22 on the horizontal axis against the force measured by a force measurement device 44 of a validation system 38 on the vertical axis. As shown in FIG. 7, as translation speed of the cutting head 22 increases, so does the measured force (albeit at a non-linear rate) considering that the jet is fully engaged with the material (i.e., jet passes completely through the coupon) in all tests. Because measured forces are believed to be generally inversely correlated with cut quality, as explained above, the data presented in FIG. 7 generally reflects the results shown in FIG. 6.

In some cases, a predetermined threshold value for the slope (i.e., instantaneous rate of change) of a curve such as the curve illustrated in FIG. 7 can be used to select an optimal or improved translation speed. For example, a predetermined threshold value for the slope of the curve of FIG. 7 can represent an upper limit on the degree to which cut quality can be sacrificed in the interest of increased cutting speed. Thus, the translation speed associated with the occurrence of the threshold value for the slope can be established or designated as an optimal or improved translation speed.

In other cases, a predetermined threshold value for the measured force can be used to select an optimal or improved translation speed. For example, a predetermined threshold value for the measured force can represent a lower limit on the quality of an acceptable cut. Thus, the translation speed associated with the occurrence of the threshold value for the measured force can be established or designated as an optimal or improved translation speed. In some cases, the occurrence of the threshold value for the measured force can correspond to a threshold value for the slope, as described above.

As an example, FIG. 7 shows the location of an optimal translation speed $v_o$ on the curve, which corresponds to a threshold or optimal force $f_{o1}$, the threshold value for the slope of the curve, and an optimal cut 56C. In some instances, cutting operations can be performed on a workpiece 14 generally corresponding to the coupon 54 while moving the cutting head 22 at a rate within an acceptable range of rates, that is, at a rate within a range $V_r$, such as within the rate $V_o$ plus or minus an acceptable variance percentage (e.g., $V_0 \pm 5\%$ or $V_0 \pm 10\%$).

In some cases, the translation speed associated with the occurrence of the threshold value for the slope or for the measured force can be a translation speed corresponding to a measured reactive force most closely approximating the respective predetermined threshold value. In some cases, the translation speed associated with the occurrence of the threshold value for the slope or for the measured force can be a translation speed corresponding to a measured reactive force less than the respective predetermined threshold value. In some cases, the translation speed used to cut a workpiece can be less than the designated optimal translation speed. For example, the translation speed used to cut a workpiece can be 95% of the designated optimal or "maximum" speed, or 90%, or 85%, or 80%, or 75%, or 70% of the designated optimal or "maximum" speed. The degree by which the translation speed used to cut a workpiece deviates from the designated optimal or "maximum" translation speed can be controlled using control software (e.g., FlowMaster™ control software or other software) running on the computer system, the control system 28, or by other means.

FIG. 8 illustrates data similar to that illustrated in FIG. 7, but for the characteristic of abrasive flow rate (i.e., rate at which abrasives are fed into a fluid jet stream to form an abrasive fluid jet) rather than cutting head translation speed. As shown in FIG. 8, the data illustrates that measured forces decreased as the abrasive flow rate increased to a transition point 58, after which the measured forces increased as the abrasive flow rate increased. In some cases, the abrasive flow rate associated with the transition point 58 is considered or can be established as an optimal abrasive flow rate. As an example, FIG. 8 shows the location of an optimal abrasive flow rate $AFR_0$ on the curve, which corresponds to a threshold or optimal force $f_{o2}$ and the transition point 58. In some instances, cutting operations can be performed on a workpiece 14 generally corresponding to the coupon 54 while feeding abrasive material(s) into the cutting head 22 at a rate within an acceptable range of rates, that is, at a rate within a range $AFR_r$, such as within the rate $AFR_o$ plus or minus an acceptable variance percentage (e.g., $AFR_0 \pm 5\%$ or $AFR_0 \pm 10\%$).

Such assessments can be conducted for a variety of characteristics of the system 10. For example, a plurality of cuts can be formed in a sample or coupon 52 while varying any one of the characteristics described herein. The forces imparted to the sample or coupon 52 during the formation of the cuts can be measured and analyzed to ascertain or establish an optimal or improved value, choice, property, or setting for the characteristic. Such techniques offer consistent and reliable quantitative assessments of cut quality and the effect of system characteristics on cut quality.

In some embodiments, the validation system 38 can be used to monitor and validate the performance of the system 10. For example, the system 10 can be set up such that all characteristics have settings matching those to be used to cut the workpiece 14. The system 10 can then be used to cut the sample or coupon 52 and the resulting reactive forces can be measured and designated as baseline reactive forces. The system 10 can then be used to cut the workpiece 14, and as the system 10 is used to cut the workpiece 14, the forces imparted by the jet 42 to the workpiece 14 can be monitored, such as by any suitable measuring device(s). Measurements of the reactive forces can be taken periodically or continually. In other cases, as the system 10 is used to cut the workpiece 14, the cutting of the workpiece 14 can be periodically interrupted so the system 10 can be used to cut the sample or coupon 52 or a different sample or coupon of the same or similar makeup, and the forces imparted by the jet 42 to the sample or coupon 52 can be measured and considered representative of the forces imparted by the jet 42 to the workpiece 14, such that the forces imparted by the jet 42 to the workpiece 14 need not be measured directly. As examples, measurements of the reactive forces imparted to the coupon 52 can be taken between successive cuts formed in the workpiece 14, between forming cuts in successive parts of the workpiece 14, or at pre-determined intervals based on the geometry of the cuts to be formed in the workpiece 14, for example. In cases in which cutting of the workpiece 14 is periodically interrupted so the system 10 can be used to cut the sample or coupon 52, the sample or coupon 52 can have characteristics matching or representative of the characteristics of the workpiece 14, or can have characteristics that do not match and are not representative of the workpiece 14.

A deviation of the measured reactive forces from the baseline reactive forces can indicate that a change in one or more of the characteristics of the system 10 is warranted. In some cases, one or more of the characteristics can be adjusted in response to such a deviation, in order to reduce or eliminate the deviation. For example, if the measured reactive forces are found to be less or greater than the baseline reactive forces, then the translation speed of the cutting head can be adjusted (e.g., at initial system set-up or in real time during operation) to compensate accordingly. As another example, if the measured reactive forces are found to be greater or less than the baseline reactive forces, then the abrasive flow rate can be adjusted (e.g., at initial system set-up or in real time during operation) to compensate accordingly. In some cases, a deviation of the measured reactive forces from the baseline reactive forces by a pre-determined threshold can indicate that a change in one or more of the characteristics of the system 10 is warranted. In some cases, the predetermined threshold can be about 1%, 2%, 5%, 10%, 15%, 20%, 25%, or 50%.

In some embodiments, the validation system 38 can be used as a diagnostic tool for the system 10. For example, measured reactive forces can be compared to baseline reactive forces, as described above. A deviation of the measured reactive forces from the baseline reactive forces by a predetermined threshold can indicate that a component of the system 10 is worn, fouled, broken, malfunctioning, or otherwise requires maintenance, or should be replaced. For example, a deviation of the measured reactive forces from the baseline reactive forces by greater than 10% may indicate that the mixing tube of the system 10 has undergone a significant amount of wear and should be replaced.

As another example, prior to cutting the workpiece 14, the system 10 can be set up such that the abrasive flow rate is zero, so the jet 42 includes no abrasive materials. The system 10 can then be used to direct the jet 42 at the base plate 46 with or without the coupon 52 situated thereon, and the resulting reactive forces can be measured and designated as baseline fluid-only reactive forces. The abrasive flow rate can then be set to a working abrasive flow rate and the system 10 can be used to cut the workpiece 14. Cutting of the workpiece 14 can be periodically interrupted so the abrasive flow rate can be set to zero, the system 10 can be used to direct the jet 42 to the base plate 46, and the forces imparted by the jet 42 to the base plate 46 can be measured and designated as measured fluid-only reactive forces. A deviation of the measured fluid-only reactive forces from the baseline fluid-only reactive forces can be indicative of a degree of wear to or the health of the orifice of the system 10, for example. Deviation of the measured fluid-only reactive forces from the baseline fluid-only reactive forces by a predetermined threshold can indicate that the orifice requires maintenance or replacement. Upon such an indication that the orifice requires maintenance or replacement, the cutting head 22 can be removed from the system 10 for inspection, maintenance, etc.

As another example, the system 10 can be set up such that all characteristics have given validation settings. The system 10 can then be used to pierce the coupon 52 and the resulting reactive forces, changes in reactive forces over the course of the piercing process, and time taken to pierce the coupon 52 can be measured and designated as baseline piercing values. The characteristics can then be set to working settings and the system 10 can be used to cut the workpiece 14. Cutting of the workpiece 14 can be periodically interrupted so the characteristics have the given validation settings, the system 10 can be used to pierce the coupon 52, and the resulting reactive forces, changes in reactive forces, and time taken to pierce the coupon 52 can be measured and designated as measured piercing values. Deviation of the measured piercing values from the baseline piercing values can indicate that a change in one or more of the characteristics of the system 10 is warranted. In some cases, one or more of the characteristics can be adjusted in response to such a deviation, in order to reduce or eliminate the deviation. In some cases, deviation of the measured piercing values from the baseline piercing values by a predetermined threshold can indicate that a component of the system 10 is worn, fouled, broken, malfunctioning, or otherwise requires maintenance, or should be replaced.

As another example, the system 10 can be used to determine a machinability index with the aid of the coupon 52 and the validation system 38. For example, as described above, preliminary studies can be conducted to assess and/or quantify a relationship between one or more of the forces $F_v$, $F_h$, $F_j$, and cut quality for a variety of materials, such that for any specified material and cut quality, a corresponding force $F_v$, $F_h$, and/or $F_j$ is known. A machinability index for each of the materials studied can be computed or determined from the associated relationship between the one or more reactive forces and the cut quality. That is, the higher the cut quality for a given material and given reactive force(s), the higher the material's machinability index is.

As another example, the system 10 can be used to measure an angle of inclination of the jet 42. For example, the system 10 can be used to direct the jet 42 toward an upper surface of the coupon 52 while maintaining the position of the cutting head 22, and to record the resulting horizontal and vertical reactive forces, as described above. By comparing the measured horizontal and vertical reactive forces, the angle of inclination of the jet 42 with respect to the upper surface of the coupon 52 can be determined.

In some cases, this technique can be used to calibrate the inclination of the jet 42. For example, a user can instruct the computer system to orient the nozzle 40 to be generally perpendicular to the upper surface of the coupon 52. The system 10 can then be used to measure the angle of inclination as described above. The measured angle of inclination can represent a misalignment of the nozzle 40 and can be compensated for by appropriate adjustment of the system 10.

Any of the components of the fluid jet systems described herein can be controlled by one or more computer systems, either directly or through the control system 28, as described above. Similarly, any of the measurements and data referred to herein can be collected, stored, and analyzed by the computer system(s). A computer system may generally include, without limitation, one or more computing devices, such as processors, microprocessors, digital signal processors (DSP), application-specific integrated circuits (ASIC), and the like. To store information, a computer system may also include one or more storage devices, such as volatile memory, non-volatile memory, read-only memory (ROM), random access memory (RAM), and the like. The storage devices can be coupled to the computing devices by one or more buses. A computer system may further include one or more input devices (e.g., displays, keyboards, touchpads, controller modules, or any other peripheral devices for user input) and output devices (e.g., displays screens, light indicators, and the like). A computer system can store one or more programs for processing any number of different workpieces according to designated paths.

A computer system may include multiple interacting computing systems or devices, and the computer system may be connected to other devices, including through one or more networks, such as the Internet. More generally, a computing device or other computing system may comprise any combination of hardware or software that may interact and perform the described types of functionality, including without limitation, desktop or other computers, database servers, network storage devices and other network devices. In addition, the functionality provided by the computer system may in some embodiments be distributed in various software modules. Similarly, in some embodiments some of the functionality of the computer system may not be provided and/or other additional functionality may be available.

Software running on the computer system can be stored in memory while being used, or can be transferred between memory and other storage devices for purposes of memory management and data integrity. Alternatively, in other embodiments some or all of the software modules and/or systems may execute in memory on another device and communicate with the computer system via inter-computer communication. Furthermore, in some embodiments, some or all of the systems and/or modules may be implemented or provided in other manners, such as at least partially in firmware and/or hardware. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present invention may be practiced with other computer system configurations.

In view of the embodiments described above, various related diagnostic and cutting performance methods may be provided to, among other things: determine an optimal or "maximum" cutting speed; determine an optimal abrasive material; determine an optimal abrasive mesh size; determine an optimal abrasive flow rate; determine optimal orifice sizing; determine an optimal fluid pressure within a cutting system; determine the optimal size of a mixing tube of a cutting system; and/or validate or optimize new cutting system designs or new cutting head configurations.

Although an example workpiece 14 is shown in the Figures, a wide variety of workpieces, having various material compositions, sizes, thicknesses, shapes, curvatures, and other characteristics, can be cut using the system 10. Similarly, while an example sample or coupon 52 is shown in the Figures, a wide variety of coupons, having various material compositions, sizes, thicknesses, shapes, curvatures, and other characteristics, can be cut using the system 10. In many embodiments, the characteristics of the sample or coupon 52 can be selected so as to generally match or be generally representative of those of the workpiece 14 to be cut, or can be selected so that the forces imparted to the sample or coupon 52 by the jet 42 of the system 10 generally match or are generally representative of those expected to be imparted to the workpiece 14 by the jet 42 of the system 10.

Moreover, aspects, features and techniques of the various embodiments described above can be combined to provide yet further embodiments. All of the U.S. patents, U.S. patent application publications, U.S. patent applications, foreign patents, foreign patent applications and non-patent publications referred to in this specification and/or listed in the Application Data Sheet, including U.S. Provisional Patent Application No. 62/234,499, filed Sep. 29, 2015, are incorporated herein by reference, in their entirety. Aspects and features of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of establishing a working speed, the method comprising:
    forming a plurality of cuts in a coupon using a fluid jet system, each of the plurality of cuts being formed while moving at least one of a cutting head of the fluid jet system and the coupon relative to the other of the cutting head and the coupon at a different speed;
    while forming the plurality of cuts in the coupon, measuring a corresponding history of reactive forces imparted by the fluid jet system to the coupon for each of the plurality of cuts;

computing an average or typical reactive force for each corresponding history of reactive forces;

designating a first speed corresponding to an average or typical reactive force approximating a threshold allowable force as an optimal speed;

designating a second speed corresponding to the optimal speed reduced by an offset percentage as an initial working speed; and forming one or more cuts in a workpiece remote from the coupon using the cutting head of the fluid jet system while moving at least one of the cutting head and the workpiece relative to the other of the cutting head and the workpiece at the initial working speed.

2. The method of claim 1, wherein the optimal speed is considered a maximum speed at which the cutting head operates upon the coupon of material without significant degradation of a quality of the cut.

3. The method of claim 1, wherein the offset percentage is between about 5 percent and about 15 percent.

4. The method of claim 1, wherein designating a first speed corresponding to an average or typical reactive force approximating the threshold allowable force as an optimal speed comprises designating a first speed corresponding to an average or typical reactive force most closely approximating the threshold allowable force as the optimal speed.

5. The method of claim 1, wherein designating a first speed corresponding to an average or typical reactive force approximating the threshold allowable force as an optimal speed comprises designating a first speed corresponding to an average or typical reactive force less than the threshold allowable force as the optimal speed.

6. The method of claim 1, further comprising:
assessing a quality of each of the plurality of cuts; and
computing a machinability index of the coupon based on the quality and history of reactive forces associated with each of the cuts.

7. The method of claim 1 wherein the different speeds at which each of the plurality of cuts are formed in the coupon are separated by regular intervals.

8. The method of claim 1 wherein the different speeds at which each of the plurality of cuts are formed in the coupon are separated by irregular intervals.

9. The method of claim 1 wherein the different speeds at which each of the plurality of cuts are formed in the coupon successively increase with each respective one of the plurality of cuts.

10. The method of claim 1 wherein the different speeds at which each of the plurality of cuts are formed in the coupon successively decrease with each respective one of the plurality of cuts.

11. The method of claim 1, further comprising:
removing a portion of the workpiece to form the coupon.

12. The method of claim 1, further comprising:
calculating an average force measurement based on the measured history of reactive forces imparted by the fluid jet system to the coupon.

* * * * *